United States Patent
Cihlar et al.

(10) Patent No.: US 10,228,141 B2
(45) Date of Patent: Mar. 12, 2019

(54) FUEL SUPPLY CONDUIT ASSEMBLIES

(71) Applicant: General Electric Company, Schenectady, NY (US)

(72) Inventors: David William Cihlar, Greenville, SC (US); Christopher Paul Willis, Pickens, SC (US); Marissa Ann Singley, Greenville, SC (US); Jonathan Glenn Reed, Greer, SC (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 15/061,434

(22) Filed: Mar. 4, 2016

(65) Prior Publication Data

US 2017/0254542 A1 Sep. 7, 2017

(51) Int. Cl.
*F23R 3/34* (2006.01)
*F23R 3/28* (2006.01)
*F02C 7/228* (2006.01)
*F23R 3/00* (2006.01)

(52) U.S. Cl.
CPC .............. *F23R 3/346* (2013.01); *F02C 7/228* (2013.01); *F23R 3/002* (2013.01); *F23R 3/28* (2013.01); *F23R 3/283* (2013.01); *F23R 3/34* (2013.01); *F05D 2220/32* (2013.01); *F23R 2900/00005* (2013.01)

(58) Field of Classification Search
CPC .... F23R 3/346; F23R 3/34; F23R 3/28; F23R 3/283; F23R 2900/00005; F02C 7/22; F02C 7/222
See application file for complete search history.

(56) References Cited

U.S. PATENT DOCUMENTS

| | | | |
|---|---|---|---|
| 4,099,799 A | 7/1978 | Etsion | |
| 4,567,730 A | 2/1986 | Scott | |
| 4,903,480 A | 2/1990 | Lee et al. | |
| 5,220,787 A | 6/1993 | Bulman | |
| 5,640,851 A | 6/1997 | Toon et al. | |

(Continued)

FOREIGN PATENT DOCUMENTS

| | | |
|---|---|---|
| CA | 2597846 C | 10/2014 |
| CH | 698 570 A2 | 8/2009 |

(Continued)

OTHER PUBLICATIONS

Extended European Search Report and Opinion issued in connection with corresponding EP Application No. 17157810.7 dated Jul. 6, 2017.

(Continued)

*Primary Examiner* — Steven Sutherland
(74) *Attorney, Agent, or Firm* — Armstrong Teasdale LLP

(57) ABSTRACT

An axial fuel staging (AFS) system for a combustor is provided. The AFS system includes a secondary fuel injector, an injector housing surrounding the secondary fuel injector, and a conduit assembly in flow communication with the secondary fuel injector. The conduit assembly includes a first conduit for conveying fuel to the secondary fuel injector, and a second conduit circumscribing the first conduit such that a channel is defined between the first conduit and the second conduit. The first conduit and the second conduit terminate within the injector housing.

15 Claims, 3 Drawing Sheets

(56) References Cited

U.S. PATENT DOCUMENTS

| | | | |
|---|---|---|---|
| 5,791,137 A | 8/1998 | Evans et al. | |
| 5,797,267 A * | 8/1998 | Richards | F23R 3/346 60/737 |
| 6,915,636 B2 | 7/2005 | Stuttaford et al. | |
| 7,878,000 B2 | 2/2011 | Mancini et al. | |
| 8,113,001 B2 | 2/2012 | Singh et al. | |
| 8,387,391 B2 | 3/2013 | Patel et al. | |
| 8,438,856 B2 | 5/2013 | Chila et al. | |
| 8,590,311 B2 | 11/2013 | Parsania et al. | |
| 8,745,987 B2 | 6/2014 | Stoia et al. | |
| 8,863,525 B2 | 10/2014 | Toronto et al. | |
| 2009/0044540 A1 | 2/2009 | Pangle et al. | |
| 2009/0218421 A1 | 9/2009 | Kumaravelu | |
| 2010/0293957 A1 | 11/2010 | Chen et al. | |
| 2011/0203287 A1 | 8/2011 | Chila et al. | |
| 2011/0289928 A1* | 12/2011 | Fox | F23R 3/286 60/740 |
| 2012/0304652 A1 | 12/2012 | Crawley et al. | |
| 2013/0067921 A1 | 3/2013 | Hadley et al. | |
| 2013/0174558 A1 | 7/2013 | Stryapunin | |
| 2014/0026581 A1 | 1/2014 | Clifford et al. | |
| 2014/0137566 A1* | 5/2014 | Shershnyov | F23D 11/408 60/776 |
| 2014/0260258 A1 | 9/2014 | Melton et al. | |
| 2014/0260264 A1 | 9/2014 | Stoia et al. | |
| 2014/0260272 A1 | 9/2014 | Dicintio et al. | |
| 2014/0260273 A1 | 9/2014 | Melton et al. | |
| 2014/0260274 A1 | 9/2014 | Stoia et al. | |
| 2014/0260275 A1 | 9/2014 | Melton et al. | |
| 2014/0260277 A1 | 9/2014 | Dicintio et al. | |
| 2014/0260279 A1 | 9/2014 | Dicintio et al. | |
| 2014/0260280 A1 | 9/2014 | Willis et al. | |
| 2014/0260318 A1 | 9/2014 | Willis et al. | |
| 2014/0260319 A1 | 9/2014 | Melton et al. | |
| 2014/0352316 A1 | 12/2014 | Fadde et al. | |
| 2014/0360193 A1 | 12/2014 | Stoia et al. | |
| 2015/0027126 A1* | 1/2015 | Berry | F02C 7/222 60/739 |
| 2015/0300206 A1 | 10/2015 | Sultana et al. | |
| 2016/0265781 A1 | 9/2016 | Carnell, Jr. et al. | |
| 2016/0265782 A1 | 9/2016 | Bhagat et al. | |
| 2017/0254537 A1 | 9/2017 | Cihlar et al. | |
| 2017/0254540 A1 | 9/2017 | DiCintio et al. | |
| 2017/0254542 A1 | 9/2017 | Cihlar et al. | |
| 2017/0268779 A1 | 9/2017 | Godfrey et al. | |
| 2017/0268783 A1 | 9/2017 | Cihlar et al. | |

FOREIGN PATENT DOCUMENTS

| | | |
|---|---|---|
| DE | 29618609 U1 | 12/1996 |
| DE | 102004045993 A1 | 4/2006 |
| EP | 2085574 A1 | 8/2009 |
| GB | 2014644 A | 8/1979 |
| WO | 2014090741 A1 | 6/2014 |

OTHER PUBLICATIONS

Extended European Search Report and Opinion issued in connection with related EP Application No. 17157808.1 dated Jul. 14, 2017.

Extended European Search Report and Opinion issued in connection with related EP Application No. 17157809.9 dated Jul. 6, 2017.

* cited by examiner

FUEL SUPPLY CONDUIT ASSEMBLIES

BACKGROUND

The field of this disclosure relates generally to fuel supply conduits and, more particularly, to a fuel supply conduit assembly for an axial fuel staging (AFS) system of a turbine assembly.

At least some known turbine assemblies include a compressor, a combustor, and a turbine. Gas flows into the compressor and is compressed. Compressed gas is then discharged into the combustor and mixed with fuel, and the resulting mixture is ignited to generate combustion gases. The combustion gases are channeled from the combustor through the turbine, thereby driving the turbine which, in turn, may power an electrical generator coupled to the turbine.

Many known combustors have a plurality of combustion cans, in which each combustion can employs a fuel system including a primary fuel injector at a forward end and an axial fuel staging (AFS) system including a secondary fuel injector at an aft end. The combustion can has a liner that defines a combustion chamber, and the secondary fuel injector injects a mixture of fuel and compressed gas into the combustion chamber downstream from the primary fuel injector. A fuel supply conduit is coupled to the secondary fuel injector for supplying fuel to the secondary fuel injector. However, because the fuel supply conduit is positioned on an outer surface of the combustion can, the fuel supply conduit is susceptible to damage or dislocation, for example, during installation or maintenance. Additionally, if the conduit becomes damaged or dislocated, there is a possibility that the conduit may start leaking fuel.

BRIEF DESCRIPTION

In one aspect, an axial fuel staging (AFS) system for a combustor is provided. The AFS system includes a secondary fuel injector, an injector housing surrounding the secondary fuel injector, and a conduit assembly in flow communication with the secondary fuel injector. The conduit assembly includes a first conduit for conveying fuel to the secondary fuel injector, and a second conduit circumscribing the first conduit such that a channel is defined between the first conduit and the second conduit. The first conduit and the second conduit terminate within the injector housing.

In another aspect, a combustor is provided. The combustor includes a sleeve assembly defining a combustion chamber, and a secondary fuel injector coupled to the sleeve assembly such that the secondary fuel injector is in flow communication with the combustion chamber. The combustor also includes an injector housing surrounding the secondary fuel injector, and a conduit assembly radially outward of the sleeve assembly and coupled to the secondary fuel injector for supplying fuel to the secondary fuel injector. The conduit assembly includes a first conduit for supplying the fuel to the secondary fuel injector, and a second conduit circumscribing the first conduit to define a channel between the first conduit and the second conduit. The first conduit and the second conduit terminate within the injector housing.

In another aspect, a turbine assembly is provided. The turbine assembly includes a turbine and a combustor coupled in flow communication with the turbine. The combustor includes a sleeve assembly defining a combustion chamber, and a secondary fuel injector coupled to the sleeve assembly such that the secondary fuel injector is in flow communication with the combustion chamber. The combustor also includes an injector housing surrounding the secondary fuel injector, and a conduit assembly radially outward of the sleeve assembly and coupled to the secondary fuel injector for supplying fuel to the secondary fuel injector. The conduit assembly includes a first conduit for supplying the fuel to the secondary fuel injector, and a second conduit circumscribing the first conduit to define a channel between the first conduit and the second conduit. The first conduit and the second conduit terminate within the injector housing.

DETAILED DESCRIPTION

The following detailed description illustrates conduit assemblies by way of example and not by way of limitation. The description should enable one of ordinary skill in the art to make and use the fuel supply conduit assemblies, and the description describes several embodiments of the fuel supply conduit assemblies, including what is presently believed to be the best modes of making and using the fuel supply conduit assemblies. An exemplary conduit assembly is described herein as being coupled within a turbine assembly. However, it is contemplated that the conduit assembly has general application to a broad range of systems in a variety of fields other than turbine assemblies.

Figure 1:
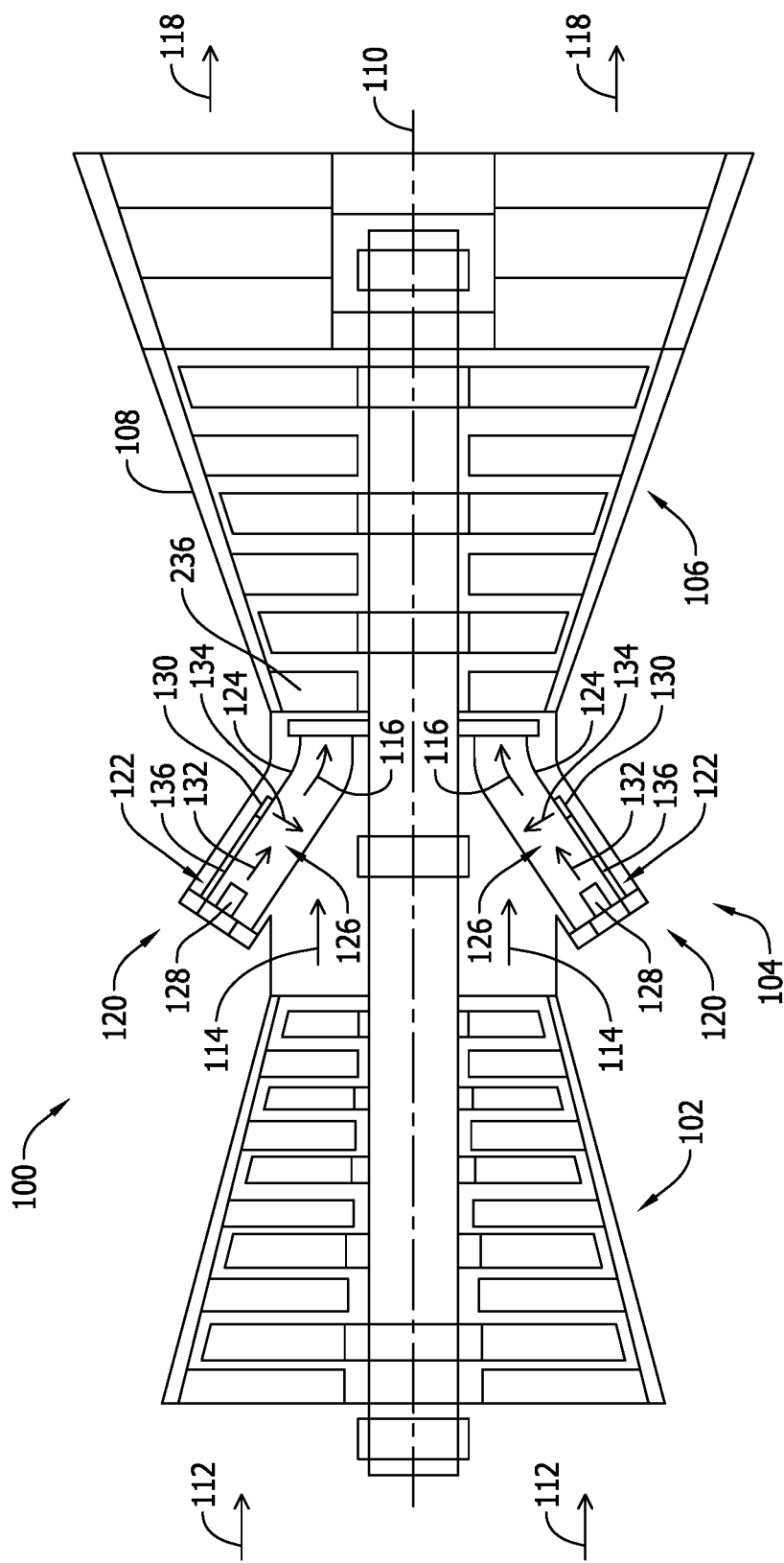
FIG. 1 is a schematic illustration of an exemplary turbine assembly.

FIG. 1 illustrates an exemplary turbine assembly 100. In the exemplary embodiment, turbine assembly 100 is a gas turbine assembly that includes a compressor section 102, a combustor section 104, and a turbine section 106 coupled in flow communication with one another within a casing 108. The compressor section 102 and the turbine section 106 are joined by a rotor that defines a centerline axis 110. In operation, a working gas 112 flows into compressor section 102 and is compressed. Compressed gas 114 is then channeled into combustor section 104, such that compressed gas 114 is mixed with fuel (not shown) and ignited in combustor section 104 to generate combustion gases 116. Combustion gases 116 are channeled through turbine section 106 and then discharged from turbine assembly 100 as exhaust 118.

In the exemplary embodiment, combustor section 104 has a plurality of spaced-apart combustion cans 120 and a fuel delivery system coupled to each combustion can 120. Each combustion can 120 has a sleeve assembly 124 that includes a liner that defines a combustion chamber 126, and a primary fuel injector 128 is positioned at the forward end of the combustion can 120. An axial fuel staging (AFS) system 122 supplies fuel to a secondary fuel injector 130 that is coupled to sleeve assembly 124 downstream from primary fuel injector 128. A first mixture 132 of fuel and compressed gas is injected into combustion chamber 126 via primary fuel injector 128, and a second mixture 134 of fuel and compressed gas is injected into combustion chamber 126 via secondary fuel injector 130. Notably, AFS system 122 also includes a fuel supply conduit assembly 136 for supplying fuel to secondary fuel injector 130, as described below.

Figure 2:
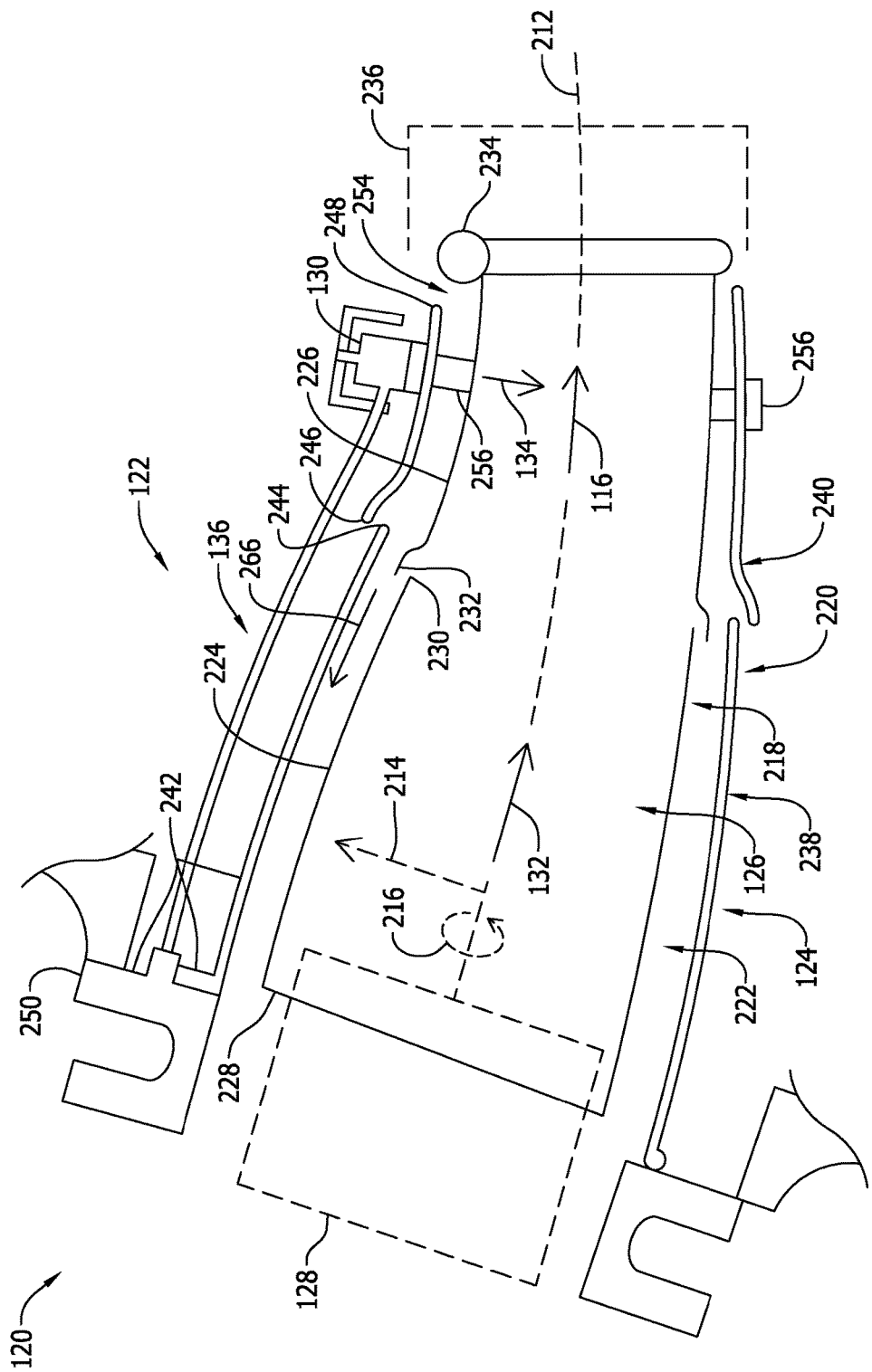
FIG. 2 is a schematic illustration of an exemplary AFS system for use with a combustor of the turbine assembly shown in FIG. 1.

FIG. 2 illustrates a combustion can 120 having an exemplary AFS system 122. In the exemplary embodiment, AFS system 122 includes a secondary fuel injector 130 that is in flow communication with combustion chamber 126 defined by sleeve assembly 124 of combustion can 120. It should be appreciated that, while reference is made herein to a single and exemplary secondary fuel injector and its accompanying AFS system, combustion can 120 may be provided with a number of secondary fuel injectors (each with its own AFS system), as needs dictate. Such secondary fuel injectors 130 may or may not be uniformly spaced around the circumference of the sleeve assembly 124, and may or may not be located within a single axial plane.

Combustion chamber 126 has a flow axis 212, such that sleeve assembly 124 has a radial dimension 214 and a circumferential dimension 216 relative to flow axis 212. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

In the exemplary embodiment, sleeve assembly 124 has a liner subassembly 218 and a shell subassembly 220 coupled to liner subassembly 218 such that shell subassembly 220 circumscribes liner subassembly 218 in radially spaced relation to define a cooling duct 222 therebetween. In the illustrated embodiment, subassembly 218 includes a liner component 224 and a transition component 226. Liner component 224 has a forward end 228 and an aft end 230, and transition component 226 also has a forward end 232 and an aft end 234. Liner component forward end 228 circumscribes primary fuel injector 128, and liner component aft end 230 is coupled to transition component forward end 232. Transition component forward end 232 circumscribes liner component aft end 230, and transition component aft end 234 is coupled to a turbine nozzle 236. As such, liner subassembly 218 circumscribes combustion chamber 126, which extends from primary fuel injector 128 to turbine nozzle 236. In other embodiments, liner subassembly 218 may have any suitable number of components coupled between primary fuel injector 128 and turbine nozzle 236 in any suitable manner that permits AFS system 122 to function as described herein (e.g., liner component 224 and transition component 226 may be integrally formed together in some embodiments). Alternatively, cooling duct 222 may not be defined between liner subassembly 218 and shell subassembly 220 in some embodiments (i.e., shell subassembly 220 may not be radially spaced apart from liner subassembly 218).

In the exemplary embodiment, shell subassembly 220 includes flow sleeve component 238 and a unisleeve component 240. Flow sleeve component 238 has a forward end 242 and an aft end 244, and unisleeve component 240 also has a forward end 246 and an aft end 248. Flow sleeve component forward end 242 is coupled to a casing flange 250, and flow sleeve component aft end 244 is coupled to unisleeve component forward end 246. Unisleeve component forward end 246 circumscribes flow sleeve component aft end 244, and unisleeve component 240 is coupled to transition component 226 of liner subassembly 218 between unisleeve component ends 246 and 248 via a plurality of circumferentially-spaced fasteners (e.g., injector bosses 256), as set forth in more detail below. As such, unisleeve component aft end 248 is axially-spaced apart from transition component aft end 234 to define an axial gap 254 therebetween.

Secondary fuel injector 130 is coupled to unisleeve component 240 of shell subassembly 220 at a boss 256, which penetrates both unisleeve component 240 of shell subassembly 220 and transition component 226 of liner subassembly 218 such that secondary fuel injector 130 extends through unisleeve component 240 and transition component 226 via boss 256. In one embodiment, boss 256 functions as a fastener for securing unisleeve component 240 to transition component 226. In other embodiments, secondary fuel injector 130 may be coupled to shell subassembly 220 in any suitable manner, and shell subassembly 220 may have any suitable number of components coupled between casing flange 250 and turbine nozzle 236 in any suitable manner that permits AFS system 122 to function as described herein.

During operation of combustion can 120, fuel and compressed gas are supplied to primary fuel injector 128, mixed together, and injected into combustion chamber 126 as a first fuel/air mixture 132. Similarly, fuel is supplied to secondary fuel injector 130 via a fuel supply conduit assembly 136, where fuel is mixed with compressed air in secondary fuel injector 130 and injected into combustion chamber 126 as a second fuel/air mixture 134. First fuel/air mixture 132 and second fuel/air mixture 134 are ignited inside combustion chamber 126 to generate a flow of combustion gases 116 that are channeled through turbine nozzle 236. Because liner subassembly 218 experiences higher-temperature operating conditions as a result of circumscribing combustion chamber 126 in direct contact with combustion gases 116, a flow of cooling gas 266 is simultaneously channeled through cooling duct 222 via gap 254 to convectively remove heat from liner subassembly 218 and, therefore, increase the useful life of sleeve assembly 124.

Figure 3:
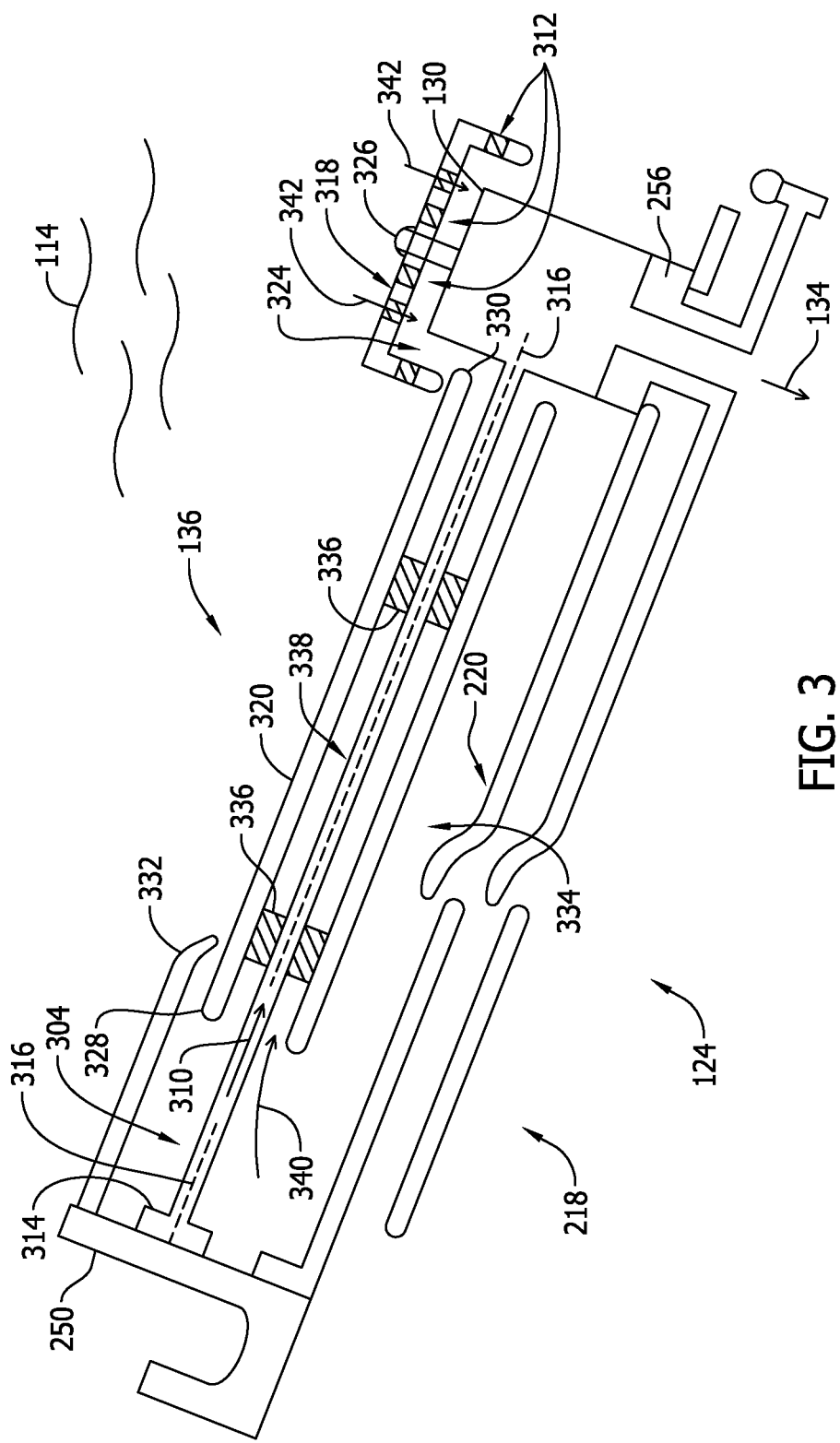
FIG. 3 is a schematic illustration of an exemplary conduit assembly for use with the AFS system shown in FIG. 2.

FIG. 3 illustrates an exemplary conduit assembly 136 for use in AFS system 122. In the exemplary embodiment, AFS system 122 includes conduit assembly 136, secondary fuel injector 130, and an injector housing 318 that surrounds secondary fuel injector 130. Injector housing 318 is coupled to secondary fuel injector 130 and/or sleeve assembly 124 to which secondary fuel injector 130 is mounted, thereby defining a protective environment 324 in which secondary fuel injector 130 is positioned. Moreover, injector housing 318 has at least one attachment site 326 that is substantially aligned with secondary fuel injector 130 and through which a mechanical fastener may be inserted to secure injector housing 318 to secondary fuel injector 130.

In the exemplary embodiment, conduit assembly 136 has a first conduit 304 surrounded by a second conduit 320, which acts as a protective sheath. The aft end of first conduit 304 is coupled in flow communication with secondary fuel injector 130 for supplying fuel 310 to secondary fuel injector 130. The forward end of first conduit 304 is coupled to a casing flange 250 at a flexible joint 314, and first conduit 304 thus extends from joint 314 to secondary fuel injector 130 along a flow axis 316 such that first conduit 304 circumscribes flow axis 316. First conduit 304 may have any suitable cross-sectional shape (e.g., first conduit 304 may have a round cross-section in some embodiments, or a square cross-section in other embodiments). Alternatively, although first conduit 304 extends through casing flange 250 in the exemplary embodiment, first conduit 304 may be coupled to, or extend through, an alternate flange or connection point in other embodiments.

Second conduit 320 may be described as a sheath segment. Second conduit 320 protects first conduit 304 from damage or dislocation, as may occur during the handling, installation, or maintenance of combustion can 120. Second conduit 320 has an inlet end 328 and a discharge end 330.

Inlet end 328 of second conduit 320 is positioned radially inward of a conduit housing 332, which shields flexible joint 314, thereby reducing the likelihood that conduit assembly 136 may be dislocated in the event that conduit assembly 136 is snagged or pulled radially outward from combustion can 120. Conduit housing 332 is attached to, or integral with, casing flange 250. Discharge end 330 of second conduit 320 is coupled to, or contained within, injector housing 318. Second conduit 320 is radially spaced apart from sleeve assembly 124 in its extension from conduit housing 332 to injector housing 318 to define a lengthwise space 334 between second conduit 320 and sleeve assembly 124. In other embodiments, first conduit 304 and/or second conduit 320 may be coupled to casing flange 250 and/or sleeve assembly 124 in any suitable manner (e.g., joint 314 may not be flexible in some embodiments, and/or space 334 may not be defined between second conduit 320 and sleeve assembly 124 in some embodiments).

Notably, first conduit 304 extends through second conduit 320 to injector housing 318. More specifically, second conduit 320 circumscribes first conduit 304 about flow axis 316 and is spaced apart from first conduit 304 by at least one spacer 336 (e.g., a gas-permeable spacer such as a mesh spacer) that circumscribes first conduit 304 about flow axis 316 to define a circumferential channel 338 about first conduit 304. For example, first conduit 304 may be supported substantially concentrically within second conduit 320 by spacer(s) 336 such that channel 338 circumscribes first conduit 304. Spacer 336 may be a mesh screen, which permits air flow therethrough, or may be a spring or wire, which is wrapped around first conduit 304 and permits air flow therearound. In other embodiments, first conduit 304 may not be supported substantially concentrically within second conduit 320 by spacer(s) 336 (i.e., conduit assembly 136 may not include spacer(s) 336 in some embodiments).

During operation, fuel 310 flows into secondary fuel injector 130 via first conduit 304, and compressed gas 114 flows as a first stream 342 into secondary fuel injector 130 through inlet ports 312 in injector housing 318. Compressed gas stream 342 within environment 324 enters secondary fuel injector 130, where the compressed gas stream 342 is mixed with fuel 310 from first conduit 304 prior to being injected as a mixture 134 into combustion chamber 126 defined by sleeve assembly 124. Additionally, a second, relatively small stream 340 of compressed gas 114 (relatively small in comparison to the volume of first compressed gas stream 342 flowing through injector housing 318) flows into environment 324 via second conduit 320 that surrounds first conduit 304 (i.e., second stream 340 flows through inlet end 328, along channel 338, across spacer(s) 336, and into environment 324). Thus, second conduit 320 functions as a passive purge system in the event that fuel 310 leaks from first conduit 304. Particularly, if fuel 310 leaks from first conduit 304, the leaking fuel 310 is contained within second conduit 320 and is ultimately flushed (or purged) into secondary fuel injector 130 via second stream 340 of compressed gas 114 flowing through channel 338. Additionally, because the majority of the compressed gas 114 needed by the secondary fuel injector 130 is supplied by first stream 342 via inlet port(s) 312 of injector housing 318, only a fraction of the overall supply of compressed gas 114 is utilized for the purpose of flushing (or purging) fuel 310 that may leak from first conduit 304. As a result, a large part of the overall flow of compressed gas 114 into secondary fuel injector 130 ends up being conditioned (or filtered) by injector housing 318, thereby making the overall flow of compressed gas 114 into secondary fuel injector 130 smoother (or more uniform). Optionally, in some embodiments, second conduit 320 of conduit assembly 136 may be perforated with a plurality of apertures (not shown) that enable at least one additional stream (not shown) of compressed gas 114 to enter channel 338 for flushing potential fuel leaks into secondary fuel injector 130. Because second conduit 320 of conduit assembly 136 circumscribes first conduit 304 between conduit housing 332 and injector housing 318 along flow axis 316, second conduit 320 shields first conduit 304 from contacting nearby structures (e.g., sleeve assembly 124) or from being contacted itself during installation or maintenance, thereby reducing the likelihood of first conduit 304 being damaged (e.g., bent or dislocated).

The methods and systems described herein provide a circumferential sheath for protecting a fuel conduit in an AFS system of a combustor. Moreover, the methods and systems provide a sheath that completely circumscribes a fuel conduit to facilitate shielding the fuel conduit from damage or dislocation when the combustor is assembled, serviced, and/or operated. Moreover, the methods and systems facilitate containing fuel that may leak from the fuel conduit, and flushing (or purging) the fuel leak(s) into a secondary fuel injector of the AFS system. Additionally, the methods and systems facilitate utilizing less of the overall supply of compressed gas to the secondary fuel injector for the purpose of flushing fuel leaks from the fuel conduit, which enables more compressed gas to enter the secondary fuel injector through a conditioner (or filter) that smooths the flow of compressed gas into the secondary fuel injector. Therefore, the methods and systems enable the AFS system to operate more effectively.

Exemplary embodiments of methods and systems are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. An axial fuel staging (AFS) system for a combustor, said AFS system comprising:
   a secondary fuel injector;
   an injector housing surrounding said secondary fuel injector; and
   a conduit assembly in flow communication with said secondary fuel injector, wherein said conduit assembly comprises:
   a first conduit for conveying fuel to said secondary fuel injector;
   a second conduit circumscribing said first conduit such that a channel is defined between said first conduit and said second conduit; and
   a spacer positioned around said first conduit and supporting said first conduit concentrically within said second conduit, said spacer comprises a mesh screen and is configured to permit gas flow therethrough,
   wherein said first conduit and said second conduit terminate within said injector housing.

2. An AFS system in accordance with claim 1, wherein said injector housing comprises at least one inlet port.

3. An AFS system in accordance with claim 1, wherein said second conduit comprises an inlet end and a discharge end, said second conduit being coupleable to said injector housing at said discharge end such that said inlet end is in flow communication with said injector housing across said channel and said discharge end.

4. An AFS system in accordance with claim 3, further comprising a conduit housing, said conduit housing being located radially outward of said inlet end of said second conduit.

5. An AFS system in accordance with claim 1, wherein said second conduit is positioned to contain fuel leaks from said first conduit and to flush leaked fuel from said first conduit into said secondary fuel injector.

6. A combustor comprising:
a sleeve assembly defining a combustion chamber;
a casing flange coupled to said sleeve assembly;
a secondary fuel injector coupled to said sleeve assembly such that said secondary fuel injector is in flow communication with said combustion chamber;
an injector housing surrounding said secondary fuel injector; and
a conduit assembly radially outward of said sleeve assembly and coupled to said secondary fuel injector for supplying fuel to said secondary fuel injector, wherein said conduit assembly comprises:
a first conduit for supplying the fuel to said secondary fuel injector, said first conduit extending through said casing flange;
a second conduit circumscribing said first conduit to define a channel between said first conduit and said second conduit, wherein said first conduit and said second conduit terminate within said injector housing; and
a flexible joint, said first conduit being coupled to said casing flange at said flexible joint.

7. A combustor in accordance with claim 6, further comprising a spacer, said spacer being positioned around said first conduit to support said first conduit concentrically within said second conduit.

8. A combustor in accordance with claim 7, wherein said spacer is gas-permeable or permits gas to flow therearound.

9. A combustor in accordance with claim 6, wherein a conduit housing is coupled to said casing flange, such that said conduit housing is positioned radially outward of said flexible joint to shield said flexible joint.

10. A combustor in accordance with claim 6, wherein said conduit assembly is spaced apart from said sleeve assembly.

11. A combustor in accordance with claim 6, wherein said second conduit comprises an inlet end and a discharge end, said second conduit being coupled to said injector housing at said discharge end such that said inlet end is in flow communication with said injector housing across said channel and said discharge end.

12. A combustor comprising:
a sleeve assembly defining a combustion chamber;
a secondary fuel injector coupled to said sleeve assembly such that said secondary fuel injector is in flow communication with said combustion chamber;
an injector housing surrounding said secondary fuel injector, wherein said injector housing comprises at least one inlet port for channeling a first compressed gas stream to the secondary fuel injector; and
a conduit assembly radially outward of said sleeve assembly and coupled to said secondary fuel injector for supplying fuel to said secondary fuel injector, wherein said conduit assembly comprises:
a first conduit for supplying the fuel to said secondary fuel injector; and
a second conduit circumscribing said first conduit to define a channel between said first conduit and said second conduit, wherein said first conduit and said second conduit terminate within said injector housing, wherein said second conduit comprises an inlet end and a discharge end, said second conduit being coupled to said injector housing at said discharge end such that said inlet end is in flow communication with said injector housing across said channel and said discharge end, and wherein said channel is configured to receive a second compressed gas stream through said channel from said inlet end to said discharge end of said second conduit.

13. A turbine assembly comprising:
a turbine; and
a combustor coupled in flow communication with said turbine, wherein said combustor comprises:
a sleeve assembly defining a combustion chamber;
a casing flange coupled to said sleeve assembly;
a secondary fuel injector coupled to said sleeve assembly such that said secondary fuel injector is in flow communication with said combustion chamber;
an injector housing surrounding said secondary fuel injector; and
a conduit assembly radially outward of said sleeve assembly and coupled to said secondary fuel injector for supplying fuel to said secondary fuel injector, wherein said conduit assembly comprises:
a first conduit for supplying the fuel to said secondary fuel injector, said first conduit extending through said casing flange;
a second conduit circumscribing said first conduit to define a channel between said first conduit and said second conduit, wherein said first conduit and said second conduit terminate within said injector housing; and
a flexible joint, said first conduit being coupled to said casing flange at said flexible joint.

14. A turbine assembly in accordance with claim 13, further comprising a spacer, said spacer being positioned around said first conduit to support said first conduit concentrically within said second conduit.

15. A turbine assembly in accordance with claim 14, wherein said spacer is gas-permeable or permits gas to flow therearound.

* * * * *